(12) United States Patent
Jung

(10) Patent No.: US 12,424,949 B2
(45) Date of Patent: Sep. 23, 2025

(54) CONTROL DEVICE FOR DRIVING SPECIAL LOAD OF VEHICLE AND THE CONTROL METHOD THEREFOR

(71) Applicant: HL MANDO CORPORATION, Pyeongtaek (KR)

(72) Inventor: Anyeol Jung, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 96 days.

(21) Appl. No.: 18/184,006

(22) Filed: Mar. 15, 2023

(65) Prior Publication Data
US 2024/0204689 A1  Jun. 20, 2024

(30) Foreign Application Priority Data
Dec. 20, 2022 (KR) .......................... 10-2022-0179687

(51) Int. Cl.
| | |
|---|---|
| *H02M 7/5387* | (2007.01) |
| *B60L 1/00* | (2006.01) |
| *B60L 50/60* | (2019.01) |
| *B60L 50/70* | (2019.01) |
| *H02M 1/00* | (2006.01) |
| *H02M 1/08* | (2006.01) |

(Continued)

(52) U.S. Cl.
CPC ............ *H02M 7/5387* (2013.01); *B60L 1/00* (2013.01); *B60L 50/60* (2019.02); *B60L 50/70* (2019.02); *H02M 1/0009* (2021.05); *H02M 1/08* (2013.01); *H02M 5/293* (2013.01); *H02J 2300/30* (2020.01); *H02M 1/44* (2013.01)

(58) Field of Classification Search
CPC ............................ H02M 7/5387; B60L 50/60
See application file for complete search history.

(56) References Cited

U.S. PATENT DOCUMENTS

| | | | | |
|---|---|---|---|---|
| 4,225,912 A | * | 9/1980 | Messer | H02M 7/525 363/57 |
| 2006/0091836 A1 | * | 5/2006 | Oyobe | B60L 53/22 318/149 |

(Continued)

*Primary Examiner* — Daniel Kessie
(74) *Attorney, Agent, or Firm* — Harvest IP Law, LLP

(57) ABSTRACT

A control device for driving an external load which receives DC voltage from an energy supply unit of a vehicle and converts the DC voltage into AC voltage to supply voltage to a load outside the vehicle, according to one embodiment of the present disclosure, includes: a DC/AC output inverter that converts the received DC voltage into the AC voltage and outputs the converted AC voltage by switching of a switching element; a current sensor that senses an inductor current value of an output terminal of the DC/AC output inverter; a microcontroller that receives the sensed current value and outputs a pulse width modulation control signal input to the switching element of the DC/AC output inverter; a gate drive that receives the pulse width modulation control signal output from the microcontroller and outputs a gate driving signal to a gate of the switching element; and a comparator that compares the current value sensed by the current sensor with a preset reference current value and outputs a disable signal to forcibly stop outputting the gate driving signal when the sensed current value is not within the preset reference current value range.

19 Claims, 8 Drawing Sheets

(51) Int. Cl.
*H02M 5/293* (2006.01)
*H02M 1/44* (2007.01)

(56) References Cited

U.S. PATENT DOCUMENTS

2013/0286514 A1* 10/2013 Oguchi .................... H02P 3/18
361/31
2023/0264577 A1* 8/2023 Lu ......................... H02M 1/007
307/10.1

* cited by examiner

CONTROL DEVICE FOR DRIVING SPECIAL LOAD OF VEHICLE AND THE CONTROL METHOD THEREFOR

TECHNICAL FIELD

The present disclosure relates to a control device for driving an external load of a vehicle and a control method therefor, and in particular, to a control device for driving an external load of a vehicle and a control method therefor, which are capable of forcibly and quickly performing PWM on/off control by directly applying inrush current generated when driving a Vehicle to Load (V2L) external load of a vehicle to hardware in a burst mode method.

BACKGROUND

In general, a plug-in hybrid vehicle or an electric vehicle may include a large-capacity battery that stores power required for a motor for driving the vehicle, and include a charger for charging the battery by converting external power to correspond to a voltage of the battery.

Conventionally, a charger has a unidirectional power flow that converts external power and provides it to a battery. However, recently, by adopting an on/off controllable switching element instead of a diode provided in a power factor correction circuit in a charger, a so-called Vehicle to Load (V2L) technology that converts battery power into AC power by operating the power factor correction circuit like an inverter and outputs the AC power to the outside of a vehicle has been proposed.

FIG. 1 is a diagram schematically illustrating a general concept of supplying power to an external load using a V2L of a vehicle, and FIG. 2 is a waveform showing an inrush current generated when the external load of FIG. 1 is driven.

As shown in FIGS. 1 and 2, when power is supplied from a vehicle to which V2L technology is applied to an external load, the power that can be provided by the vehicle is limited and a load current amount is determined by the external load, so that an inrush current due to overload flows more than 4 times a rated current for about 10 cycles.

Therefore, a vehicle to which V2L technology is applied requires a function to stop V2L operation in order to prevent hardware burnout of a MOSFET in a DC/AC terminal during continuous forced operation under an overload condition.

FIG. 3 is a diagram schematically illustrating the configuration of a conventional control device for limiting an inrush current generated when driving an external load.

As shown in FIG. 3, a DC/AC output inverter 10 converts a DC voltage into an AC voltage and outputs it to an AC output terminal 30 through an output filter 20. In this case, the current and voltage output from the DC/AC output inverter 10 are sensed by a current sensor 40 and a voltage sensor 80. A microcontroller 50 receives the current value and the voltage value sensed, compares the input values with reference values, and controls pulse width modulation (PWM) using software techniques to limit an output inductor current.

However, although the microcontroller 50 can control the output inductor current through driving of a gate drive 60 by the command according to the current value and voltage value sensed as in the conventional case, there is a problem in that it is very difficult to quickly recognize and control a surge current within 10 μs.

SUMMARY

In view of the above, the present disclosure provides a control device for driving an external load of a vehicle and a control method therefor, which are capable of forcibly and quickly performing PWM on/off control by directly applying inrush current generated when driving a Vehicle to Load (V2L) external load of a vehicle to hardware in a burst mode method.

However, the technical objects to be achieved by the present disclosure are not limited to the technical object as described above, and other technical objects may exist.

In a control device for driving an external load which receives DC voltage from an energy supply unit of a vehicle and converts the DC voltage into AC voltage to supply voltage to a load outside the vehicle, according to one embodiment of the present disclosure, the control device includes: a DC/AC output inverter that converts the received DC voltage into the AC voltage and outputs the converted AC voltage by switching of a switching element; a current sensor that senses an inductor current value of an output terminal of the DC/AC output inverter; a microcontroller that receives the sensed current value and outputs a pulse width modulation control signal input to the switching element of the DC/AC output inverter; a gate drive that receives the pulse width modulation control signal output from the microcontroller and outputs a gate driving signal to a gate of the switching element; and a comparator that compares the current value sensed by the current sensor with a preset reference current value and outputs a disable signal to forcibly stop outputting the gate driving signal when the sensed current value is not within the preset reference current value range.

The comparator includes: a first comparator for comparing a positive current value of the AC current sensed by the current sensor with the preset reference current value; and a second comparator for comparing a negative current value of the AC current sensed by the current sensor with the preset reference current value.

In this case, the reference current value of the first comparator is set to 50 A, and the reference current value of the second comparator is set to −50 A.

The first comparator applies the disable signal to the gate drive when the current value sensed by the current sensor is 50 A or more, and the second comparator applies the disable signal to the gate drive when the current value sensed by the current sensor in is −50 A or less.

The gate drive operates in a burst mode driving method in which the gate drive is turned on/off according to the output signal of the comparator.

After the comparator outputs the disable signal to the gate drive to forcibly stop outputting the gate driving signal, the comparator outputs an enable signal so that the gate drive operates again when the current value sensed by the current sensor is within the preset reference current value range.

The control device further includes: an input filter for rectifying the DC voltage output from the energy supply unit of the vehicle; and a DC/DC converter that boosts the rectified DC voltage and outputs it to the DC/AC output inverter.

The energy supply unit of the vehicle is a hydrogen fuel cell stack or a high voltage battery.

The control device further includes: a voltage sensor for sensing a voltage of an output terminal of the DC/AC output inverter; an output filter for filtering noise of the AC voltage output from the DC/AC output inverter; and an AC output terminal for receiving an AC voltage of the output filter and applying operating power to an external device.

Further, in a control method for driving an external load of a vehicle, using a control device for driving an external load which receives DC voltage from an energy supply unit of a vehicle and converts the DC voltage into AC voltage to supply voltage to a load outside the vehicle, the method includes: converting the received DC voltage into the AC voltage and outputting the converted AC voltage by switching of a switching element in a DC/AC output inverter; sensing an inductor current value of an output terminal of the DC/AC output inverter in a current sensor; and comparing the current value sensed by the current sensor with a preset reference current value and outputting a disable signal to forcibly stop outputting a gate driving signal when the sensed current value is not within the preset reference current value range in a comparator.

In the comparing of the current value sensed by the current sensor with the preset reference current value in the comparator, a first comparator compares a positive current value of the AC current sensed by the current sensor with the preset reference current value; and a second comparator compares a negative current value of the AC current sensed by the current sensor with the preset reference current value.

In this case, the reference current value of the first comparator is set to 50 A, and the reference current value of the second comparator is set to −50 A.

The first comparator applies the disable signal to a gate drive when the current value sensed by the current sensor is 50 A or more, and the second comparator applies the disable signal to the gate drive when the current value sensed by the current sensor in is −50 A or less.

The gate drive operates in a burst mode driving method in which the gate drive is turned on/off according to the output signal of the comparator.

After the outputting the disable signal to forcibly stop outputting the gate driving signal in the comparator, the comparator outputs an enable signal so that the gate drive operates again when the current value sensed by the current sensor is within the preset reference current value range.

The control method further include: before the converting the received DC voltage into the AC voltage and outputting the converted AC voltage, rectifying the DC voltage output from the energy supply unit of the vehicle through an input filter; and boosting the rectified DC voltage and outputting it to the DC/AC output inverter through a DC/DC converter.

The energy supply unit of the vehicle is a hydrogen fuel cell stack or a high voltage battery.

The control method further includes: after the converting the received DC voltage into the AC voltage and outputting the converted AC voltage, filtering noise of the AC voltage output from the DC/AC output inverter through an output filter for; and receiving an AC voltage of the output filter and applying operating power to an external device through an AC output terminal.

After the outputting the disable signal to forcibly stop outputting the gate driving signal, the comparator outputs an enable signal so that the gate drive operates again when the current value sensed by the current sensor is within the preset reference current value range According to one embodiment of the present disclosure, it is possible to forcibly and quickly perform PWM on/off control by directly applying inrush current generated when driving a Vehicle to Load (V2L) external load of a vehicle to hardware in the burst mode method.

In addition, it is possible to satisfy the operating condition of a separate external load (e.g. chainsaw, laptop computer, etc.) by rapidly performing the control without hardware burnout.

DETAILED DESCRIPTION

Figure 1:
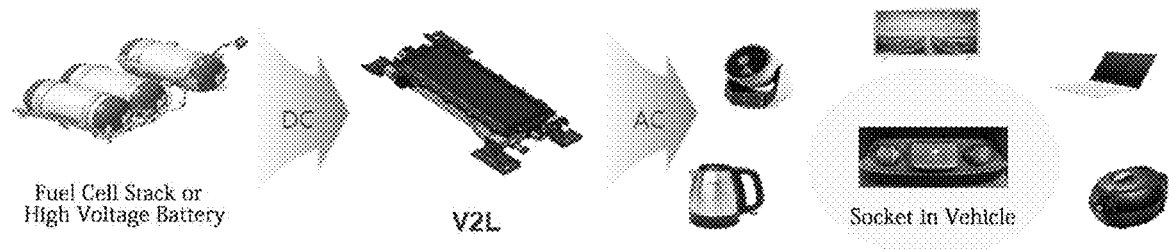
FIG. 1 is a diagram schematically illustrating a general concept of supplying power to an external load using a V2L of a vehicle.
Figure 2:
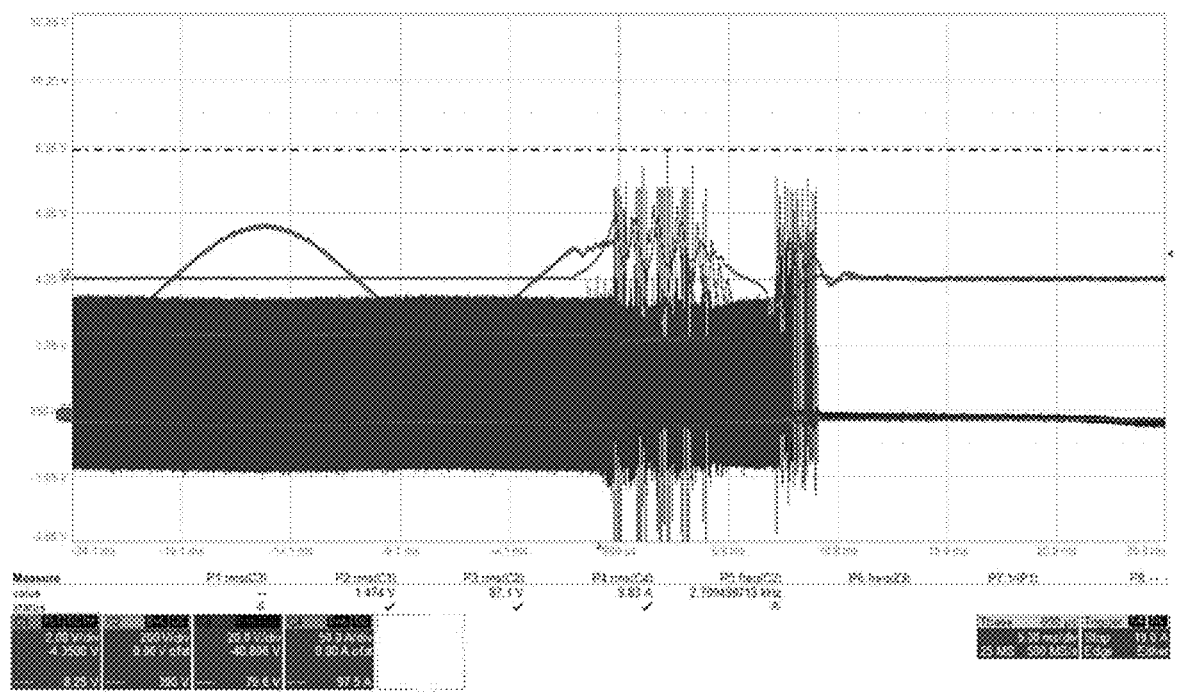
FIG. 2 is a waveform showing an inrush current generated when driving the external load of FIG. 1.
Figure 3:
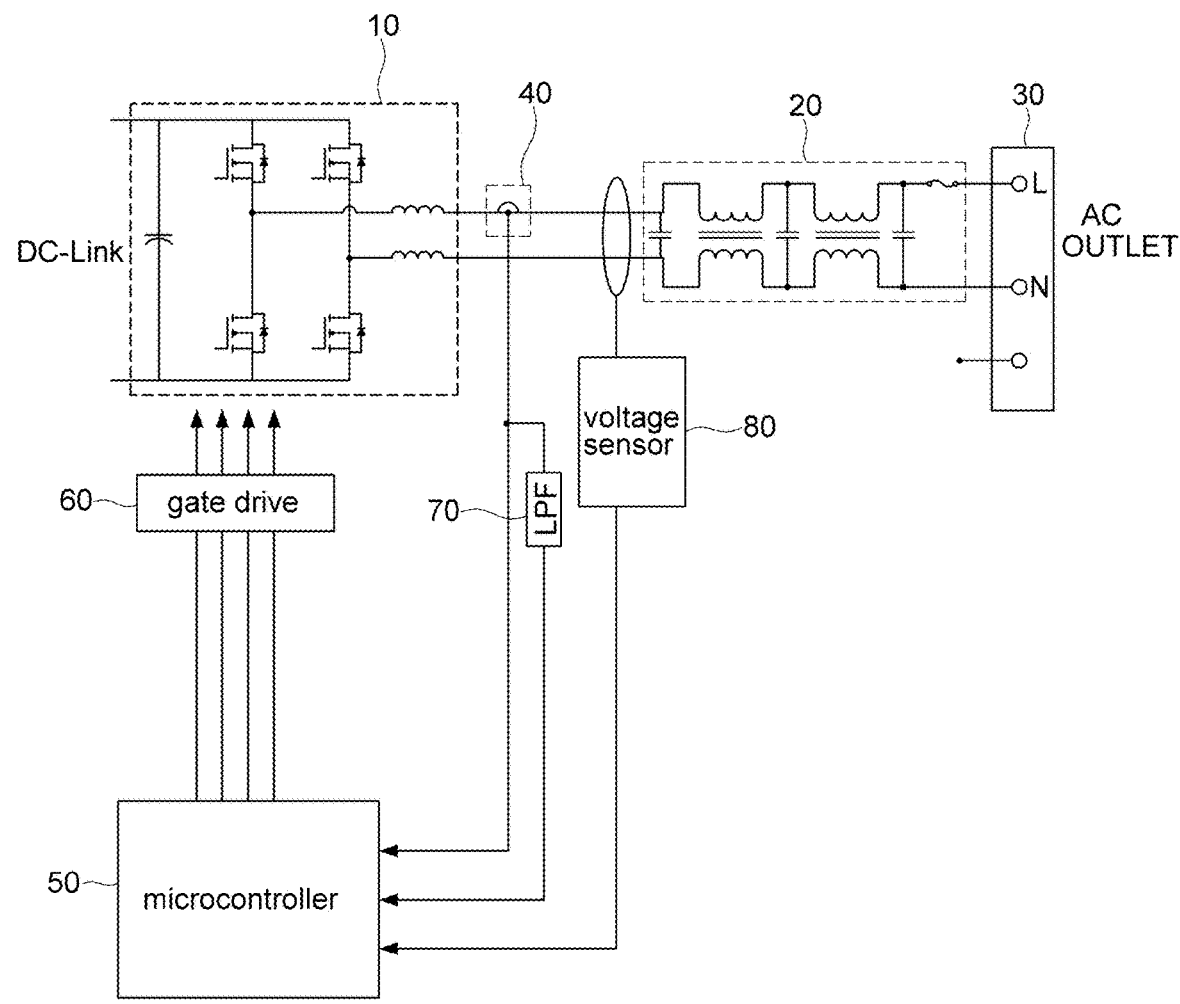
FIG. 3 is a diagram schematically showing the configuration of a conventional control device for limiting inrush current generated when driving an external load.

Hereinafter, embodiments of the present disclosure will be described in detail with reference to the accompanying drawings so that those skilled in the art can easily practice the present disclosure. However, the present disclosure may be embodied in many different forms and is not limited to the embodiments described herein. In order to clearly describe the present disclosure, parts irrelevant to the description are omitted in the drawings, and like reference numerals are given to like parts throughout the specification. In addition, while describing with reference to the drawings, even when the configurations are indicated by the same name, the reference numerals may vary depending on the drawings, and the reference numerals are provided only for convenience of description, and the concept, characteristic, function, or the effect of each component is not to be construed as being limited by the corresponding reference numeral.

Throughout the specification, when it is described that a part is "connected" to another part, this includes not only the case of being "directly connected" but also the case of being "electrically connected" with another element therebetween. In addition, when it is described that a part "includes" another component, it means that the part may further include other components, not excluding other components unless otherwise stated, and it should be understood that the presence or addition of one or more other features, numbers, steps, operations, components, parts, or combinations thereof is not precluded.

In this specification, 'unit' or 'module' includes a unit realized by hardware or software, or a unit realized by using both the hardware and the software, and one unit may be realized by using two or more hardware, or two or more units may be realized by one hardware. Furthermore, "DC"

stands for direct current, "AC" stands for alternating current, "V" is the symbol for voltage, and "A" is the symbol for Ampere.

Figure 4:
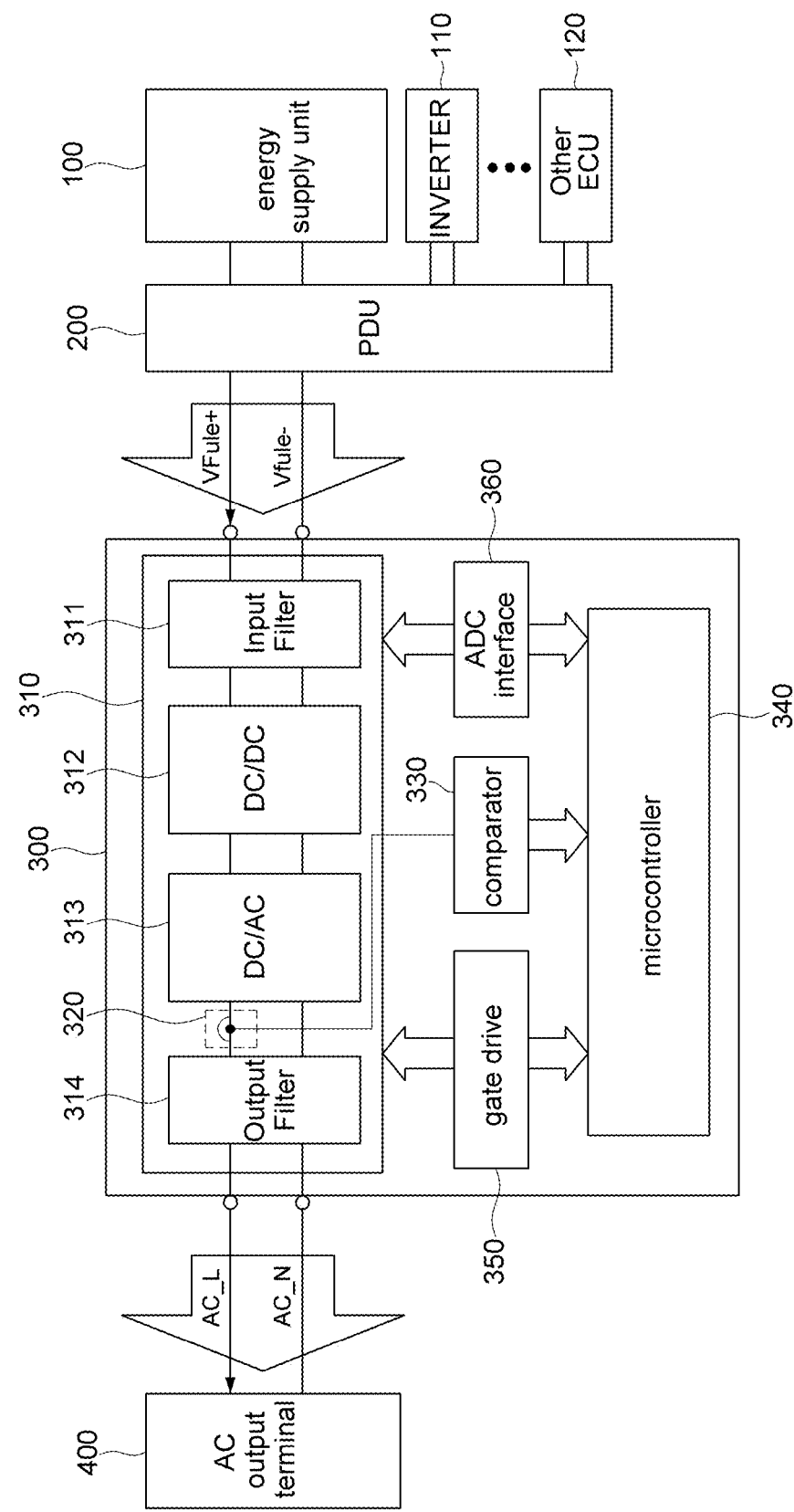
FIG. 4 is a diagram schematically showing the configuration of an overall system including a control device for driving an external load of a vehicle according to one embodiment of the present disclosure.
Figure 5:
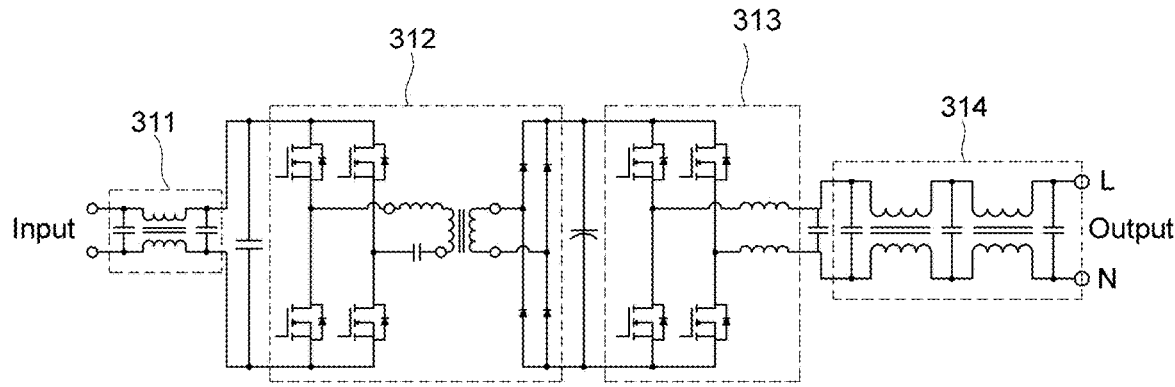
FIG. 5 is a diagram schematically illustrating a circuit configuration of a power conversion unit of FIG. 4.
Figure 6:
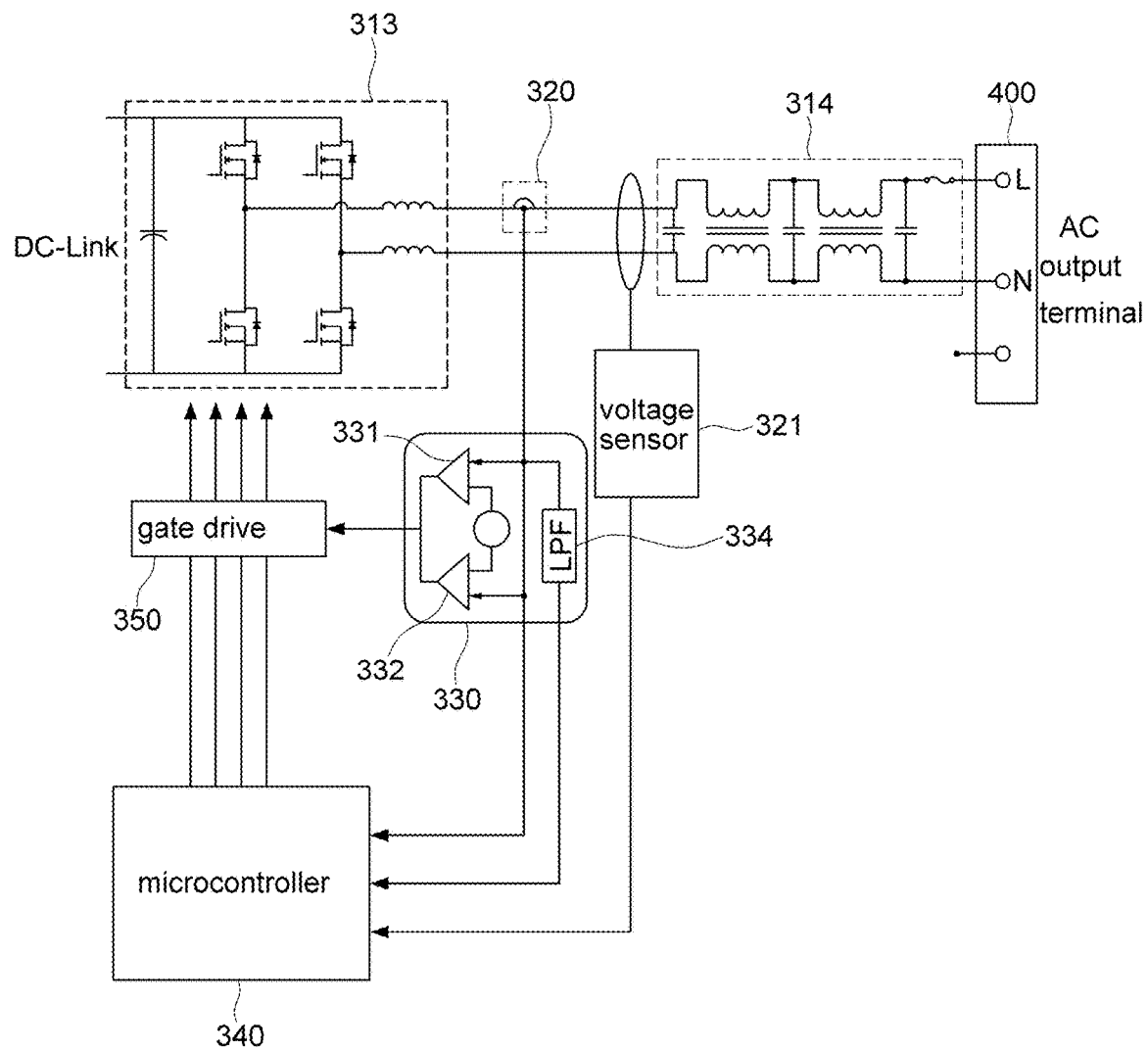
FIG. 6 is a diagram schematically showing a circuit configuration of the control device for driving an external load of a vehicle according to one embodiment of the present disclosure.
Figure 7:
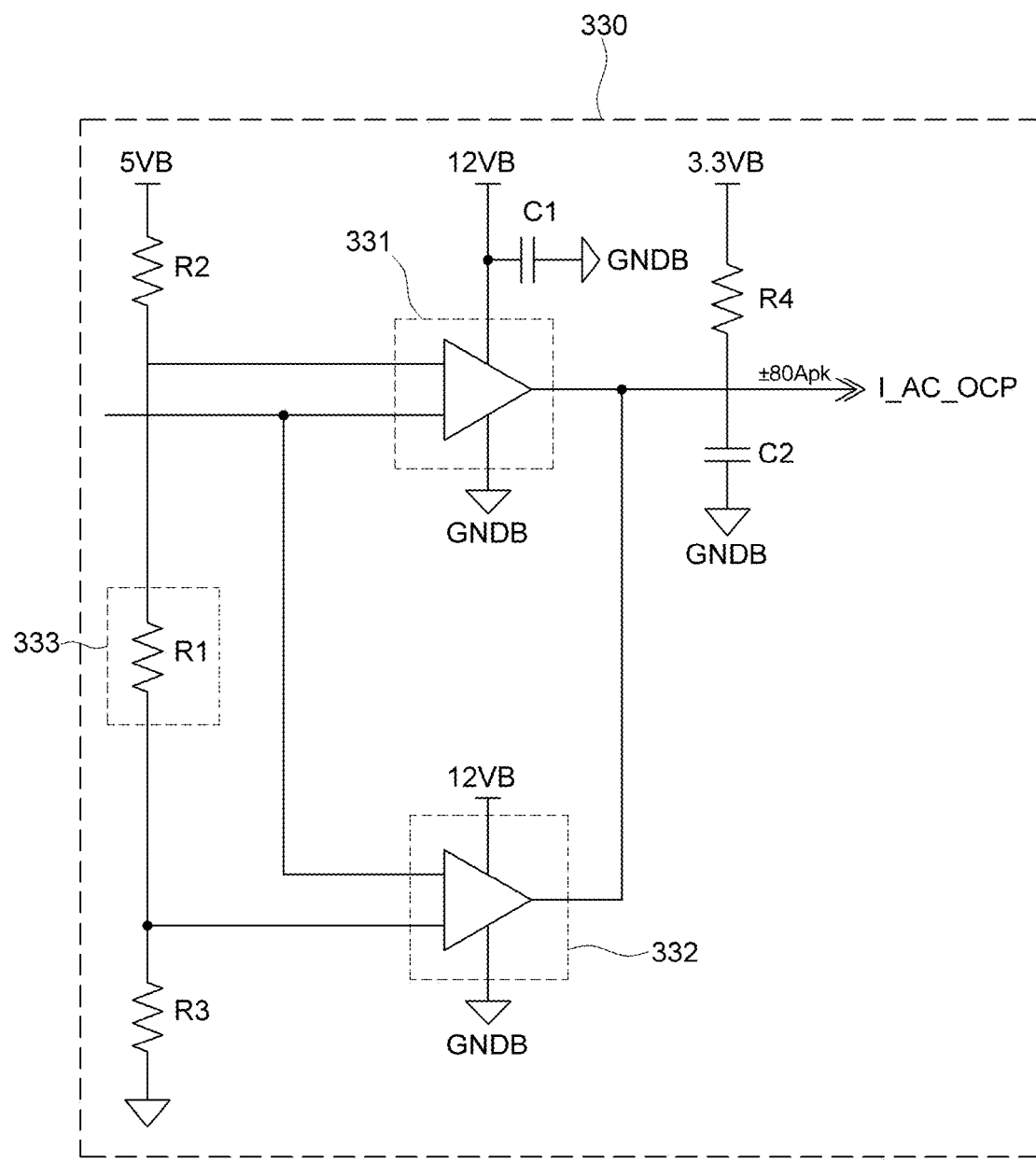
FIG. 7 is a diagram schematically showing a circuit configuration of a comparator of FIG. 6.

FIG. 4 is a diagram schematically illustrating the configuration of an overall system including a control device for driving an external load of a vehicle according to one embodiment of the present disclosure, FIG. 5 is a diagram schematically illustrating a circuit configuration of a power conversion unit of FIG. 4, FIG. 6 is a diagram schematically showing a circuit configuration of the control device for driving an external load of a vehicle according to one embodiment of the present disclosure, and FIG. 7 is a diagram schematically showing a circuit configuration of a comparator of FIG. 6.

As shown in FIG. 4, the configuration of the overall system including the control device for driving the external load of the vehicle according to the present disclosure may include an energy supply unit 100, a power distribution unit (PDU) 200, and a control device 300, and an AC output stage 400.

The energy supply unit 100 may include a hydrogen fuel cell stack of a hydrogen electric vehicle of an eco-friendly vehicle or a high voltage battery of an electric vehicle. For example, the fuel cell may be a polymer electrolyte membrane fuel cell or proton exchange membrane fuel cell (PEMFC) as a power source for driving a vehicle.

The PDU 200 may be a high-capacity power distributor that stably supplies power supplied from the energy supply unit 100 to power devices without power cut off. The PDU 200 can stably supply sufficient power, so that it can prevent unstable power supply, which is the cause of most power accidents, and systematically manage power. In addition, the PDU 200 can measure the amount of current used in real time or have various additional functions such as an overload alarm function, so that it can perform a role as management equipment beyond simple power supply and distribution, and it can also be connected to a network and can be remotely managed by exchanging data. Here, the PDU 200 may supply power to an inverter 110 that converts voltages for peripheral devices of the vehicle, an ECU 120, and the like.

The control device 300 supplies power to a load outside the vehicle by receiving the DC voltage supplied from the energy supply unit 100 and converting it into an AC voltage for driving external load of vehicle.

The control device 300 may include a power conversion unit 310 for converting the DC voltage output from the energy supply unit 100 of the vehicle into an AC voltage, a current sensor 320, a voltage sensor 321, a comparator 330, a microcontroller 340, a gate drive 350, and an ADC interface 360.

As shown in FIGS. 5 and 6, the power conversion unit 310 may include an input filter 311 for rectifying the DC voltage output from the energy supply unit 100, a DC/DC converter 312 for boosting and outputting the rectified DC voltage, a DC/AC output inverter 313 that converts the DC voltage output from the DC/DC converter 312 into the AC voltage and outputs the converted AC voltage, and an output filter 314 for filtering noise of the AC voltage output from the DC/AC output inverter 313.

The input filter 311 performs a function of removing noise of DC type voltage applied from a fuel cell stack or battery. Specifically, the input filter 311 performs the function of removing unstable noise that may exist in the DC type voltage by using an inductor and a capacitor.

The DC/DC converter 312 may control current flowing through a coil and step-down of the output voltage Vout through a transformer by alternately turning on or off a plurality of switching elements. That is, a cell stack voltage or a low voltage of the high voltage battery may be boosted to a high voltage to be outputted.

The DC/AC output inverter 313 includes a switching element and converts the DC voltage boosted by the DC/DC converter 312 into an AC voltage to provide operating power of an AC voltage corresponding to the amount of current used by the external load of the vehicle.

The output filter 314 may be an EMI (Electro-Magnetic Interference) filter composed of an inductor and/or a capacitor to remove noise of the AC voltage, and may be composed of a full-wave rectification circuit.

Since the input filter 311, the DC/DC converter 312, the DC/AC converter 313, and the output filter 314 are modules used in a general DC/AC inverter, the contents thereof will be apparent to those skilled in the art, and hereinafter, the comparator 330, which may be regarded as a feature of the present disclosure, will be described in detail.

The current sensor 320 senses an inductor current value of an output terminal of the DC/AC output inverter 313.

The voltage sensor 321 senses an inductor voltage of the output terminal of the DC/AC output inverter 313.

The comparator 330 compares the current value sensed by the current sensor 320 with a preset reference current value, and outputs a disable signal to the gate drive 350 to forcibly stop outputting a gate driving signal when the sensed current value is not within the preset reference current value range.

More specifically, as shown in FIG. 7, the comparator 330 may include a first comparator 331 that compares a positive current value of the alternating current sensed by the current sensor 320 with the preset reference current value, and a second comparator 332 that compares a negative current value of the AC current sensed by the current sensor 320 with the preset reference current value. In addition, resistors R1 (333) and R2 are connected to the positive terminal of the first comparator 331, and resistors R2 and R3 are connected to the negative terminal of the second comparator 332. Further, resistor R4 and C2 are connected to the output terminal of the first comparator 331 and the output terminal of the second comparator 332. In this case, the resistance value of R1 may be set to 1.4 k, a reference voltage value may be set to 3.47 V, and the reference current value may be set to 50 A.

For example, the reference current value of the first comparator 331 may be set to 50 A, and the reference current value of the second comparator 332 may be set to −50 A.

In addition, when the current value sensed by the current sensor 320 is 50 A or more, the first comparator 331 applies a disable signal to the gate drive 350, and when the value of the current sensed by the current sensor 320 is less than −50 A, the second comparator 332 applies a disable signal to the gate drive 350 to forcibly stop outputting the gate driving signal.

In other words, by directly applying a disable signal from the comparator 330 to the gate drive 350, the gate drive 350 is stopped and a PWM signal output from the microcontroller 340 can also automatically be switched to an off state. Accordingly, the gate drive 350 directly performs the forced stop operation faster than the microcontroller 340 forcibly stops the PWM signal according to the current value, thereby preventing burnout of the switching element.

Meanwhile, after the comparator 330 outputs the disable signal to the gate drive 350 to forcibly stop outputting the gate driving signal, when the current value sensed by the current sensor 320 is within the preset reference current value 50A, the comparator 330 outputs an enable signal so that the gate drive 350 operates again.

The microcontroller 340 receives the sensed current value and outputs a pulse width modulation control signal input to the switching element of the DC/AC output inverter.

More specifically, the microcontroller 340 controls the pulse width modulation signal by receiving the current value sensed by the current sensor 320 and the voltage value sensed by the voltage sensor 321.

The microcontroller 340 may include a voltage controller and a current controller that control switching elements of an inverter type power factor correction circuit by performing voltage-current control based on a sensed value Vac_sen of the output AC voltage and a sensed value Iac_sen of the output AC current of the device that converts the DC power of the battery in the vehicle into AC power and outputs it, and may include a setting unit that determines an upper limit value of a preset voltage command value V_d_ref and a preset current command value I_d_ref, but the present disclosure is not limited to the above.

Then, the voltage controller receives the upper current limit value determined by the setting unit, and generates and outputs a current command value I_d_ref equal to or less than the upper current limit value. That is, the microcontroller 340 receives the voltage signal from the voltage sensor 321, and determines a voltage level output for the battery based on the voltage signal.

In addition, the current controller may receive an error between the current command value I_d_ref output from the voltage controller and the current I_d of the output AC current sensed value, and generate a duty value of the switching element for converging the error between the two values to zero.

In other words, the microcontroller 340 controls the duty value of the switching element of the DC/AC output inverter by outputting the voltage command value and the current command value as pulse width modulated signals.

The gate drive 350 receives the pulse width modulation control signal output from the microcontroller 340 and outputs a gate driving signal to a gate of the switching element.

In this case, the gate drive 350 operates in a burst mode driving method in which the gate drive 350 is turned on/off according to the output signal of the comparator 330.

That is, the output of the comparator is directly connected to an enable terminal of the gate drive 350, and when the current value sensed by the current sensor 320 is greater than or equal to a preset current value, the gate drive 350 is forcibly turned off to block the gate signal applied to the switching element of the DC/AC output inverter. For example, when the sensed current exceeds 50 Apk preset as an overcurrent value in the DC/AC output inverter, burst mode operation is performed.

The AC output terminal 400 receives the AC voltage from which noise is removed from the output filter 314 and applies operating power to an external load outside the vehicle.

Figure 8:
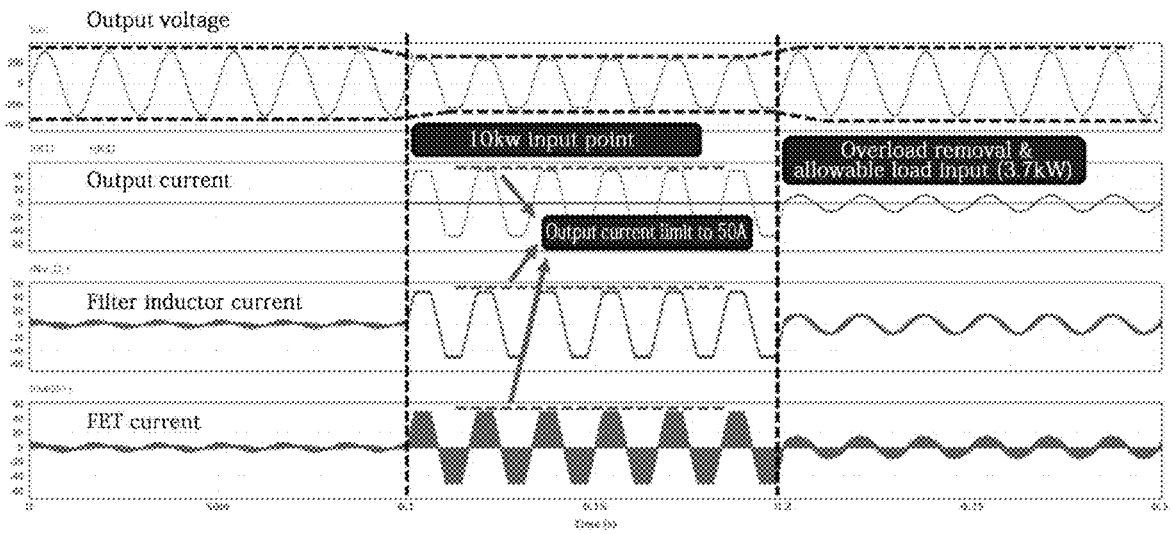
FIG. 8 is a diagram showing changes in signal waveforms when an overload is introduced into the control device for driving an external load of a vehicle according to one embodiment of the present disclosure.
Figure 9:
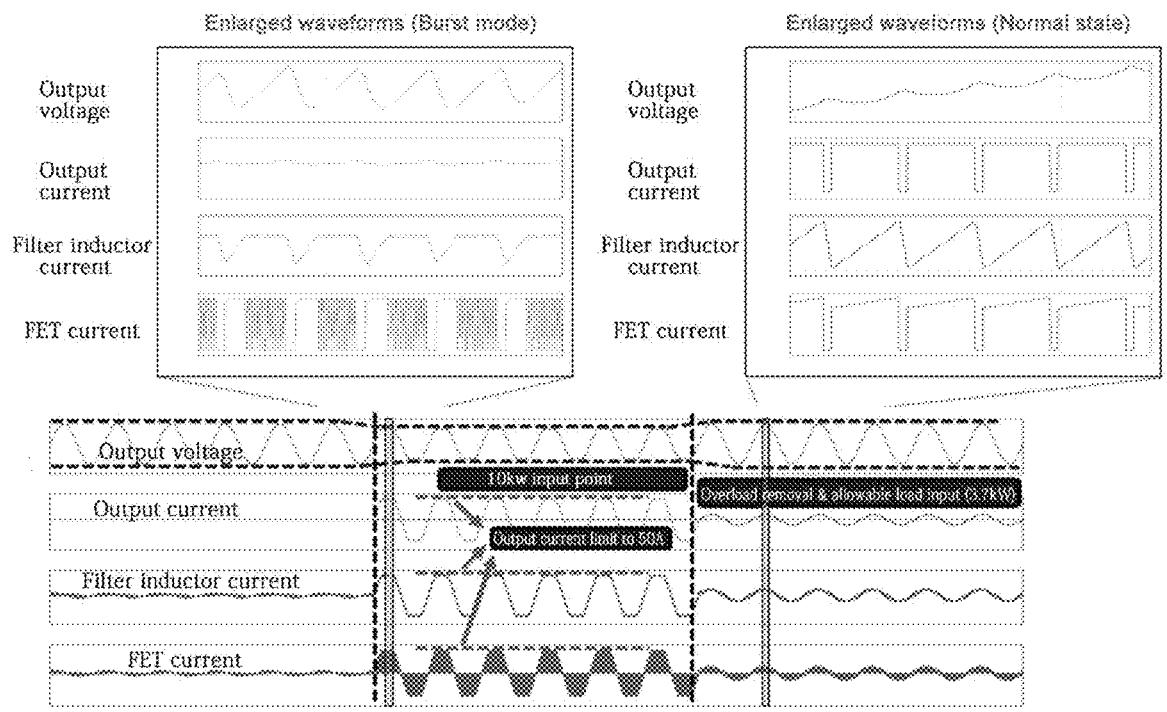
FIG. 9 shows partially enlarged views of the waveforms of FIG. 8.
Figure 10:
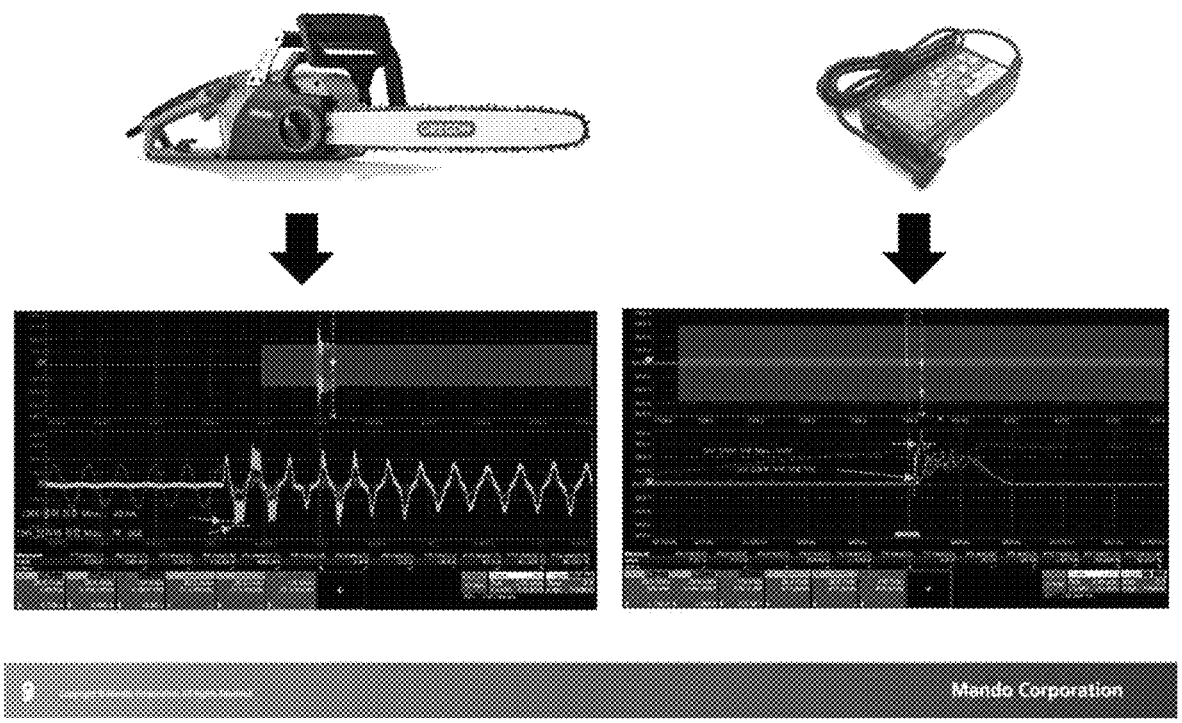
FIG. 10 is a view showing waveform results depending on inductive and capacitive loads in the control device for driving an external load of a vehicle according to one embodiment of the present disclosure.

FIG. 8 is a diagram showing changes in signal waveforms when an overload is introduced into the control device for driving an external load of a vehicle according to the present disclosure, FIG. 9 shows partially enlarged views of the waveforms of FIG. 8, and FIG. 10 is a view showing waveform results depending on inductive and capacitive loads in the control device for driving an external load of a vehicle according to the present disclosure.

As shown in FIGS. 8 and 9, it can be seen that when an overload is introduced into the control device for driving an external load of the vehicle, the output current is output in a limited state of 50 A, and when the overload is removed and the load is within the allowable range (3.7 kW) and it can be confirmed that it operates normally again. In addition, FIG. 9 shows the forcible operation waveforms by output current limitation as can be seen from the enlarged waveforms in the burst mode, and the enlarged waveforms in the normal state.

Accordingly, as shown in FIG. 10, it is shown that the waveform result is changed under an overload condition depending on an inductive/capacitive load in the control device for driving an external load of a vehicle. That is, it can be seen that the control device for driving the external load of the vehicle quickly and stably controls the current limit even in the case of an overload inrush current.

Figure 11:
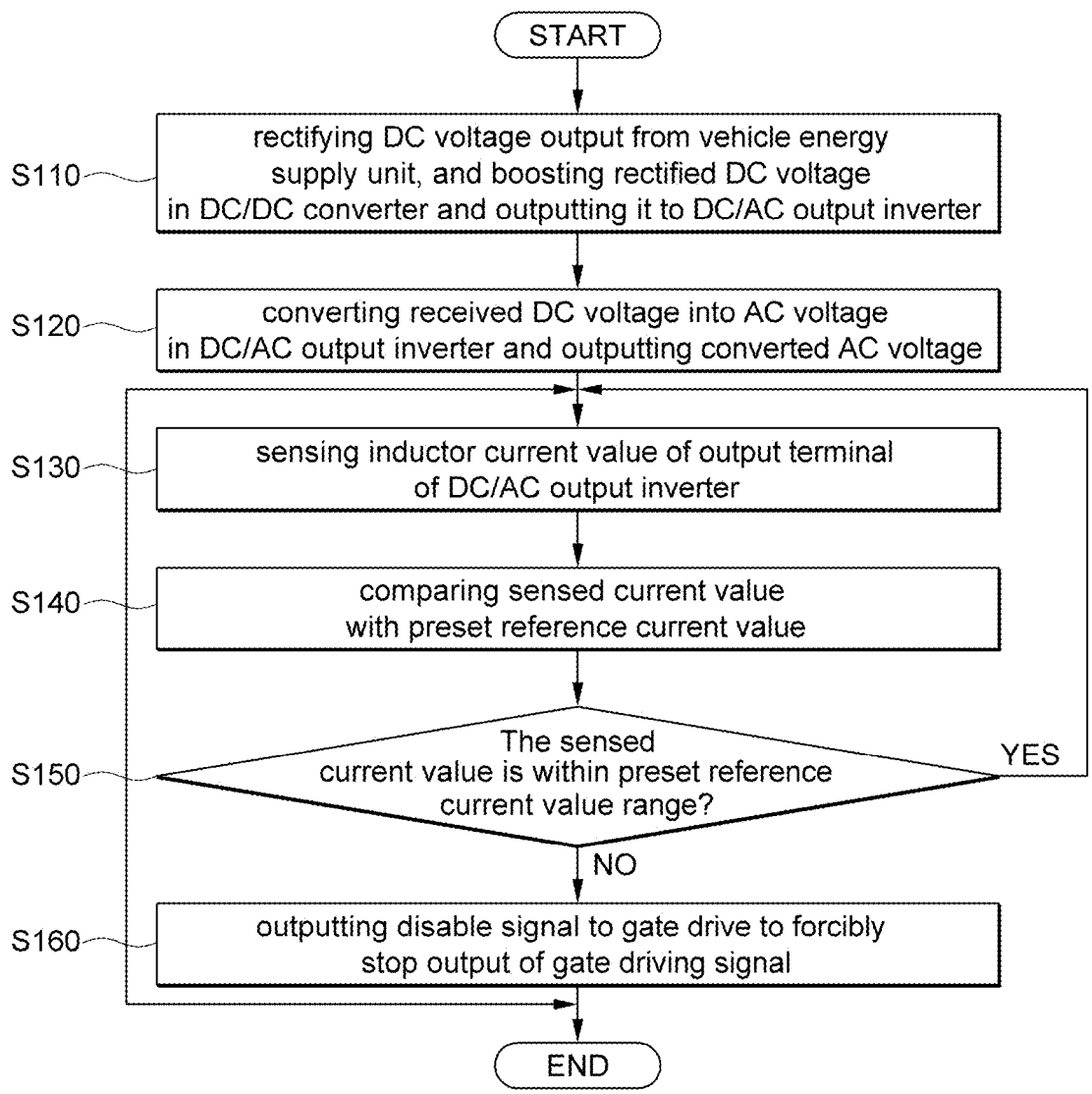
FIG. 11 is a flowchart of a control method for driving an external load according to one embodiment of the present disclosure.

FIG. 11 is a flowchart of a control method for driving an external load according to one embodiment of the present disclosure. Here, the redundant description will be omitted with reference to the parts overlapped with the above description of the device for driving an external load according to one embodiment of the present disclosure.

As shown in FIG. 11, in the control method for driving an external load, the DC voltage output from the vehicle energy supply unit 100 is rectified in the input filter, and the rectified DC voltage is boosted in the DC/DC converter to be outputted to the DC/AC output inverter (S110).

More specifically, the energy supply unit 100 may be a hydrogen fuel cell stack or a high voltage battery, and DC voltage is applied from the hydrogen fuel cell stack or the high voltage battery, and the input filter 311 converts performs a function of removing unstable noise that may exist in a DC voltage by using an inductor and a capacitor.

Then, by alternately turning on or off a plurality of switching elements in the DC/DC converter 312, it is possible to control the current flowing through the coil and to control the step-down of the output voltage Vout through the transformer. That is, the cell stack voltage or the low voltage of the high voltage battery is boosted to a high voltage to be outputted.

Next, the received DC voltage is converted into AC voltage by switching of the switching element in the DC/AC output inverter and the converted AC voltage is outputted (S120).

Specifically, the DC/AC output inverter 313 with the switching element converts the DC voltage boosted by the DC/DC converter 312 into an AC voltage to supply operating power as an AC voltage corresponding to the amount of current used by the external load of the vehicle. In this case, after removing the noise of the output AC voltage through the output filter 314, the AC voltage is supplied to the AC output terminal to apply the operating power to the external device.

Subsequently, an inductor current value of an output terminal of the DC/AC output inverter is sensed (S130). The current sensor 320 senses an inductor current value of the output terminal of the DC/AC output inverter 313.

Then, the comparator 330 compares the sensed current value with a preset reference current value (S140), and when the sensed current value is not within the preset reference current value range (S150), the comparator 330 outputs a disable signal to forcibly stop the output of the gate driving signal (S160).

Specifically, when the comparator 330 compares the sensed current value with the preset reference current value, the first comparator 331 compares a positive current value of the AC current sensed by the current sensor with the preset reference current value, and the second comparator 332 compares a negative current value of the AC current sensed by the current sensor with the preset reference current value. In this case, the reference current value of the first comparator may be set to 50 A, and the reference current value of the second comparator may be set to −50 A.

When the current value sensed by the current sensor 320 is 50 A or more, the first comparator 331 applies the disable signal to the gate drive 350, and when the current value sensed by the current sensor 320 is −50 A or less, the second comparator 332 applies the disable signal to the gate drive 350 to forcibly stop the output of the gate driving signal. Accordingly, the gate drive 350 can operate in a burst mode driving method in which the gate drive 350 is turned on/off according to the output signal of the comparator.

Meanwhile, after the comparator 330 outputs the disable signal to the gate drive 350 to forcibly stop the output of the gate driving signal, when the current value sensed by the current sensor 320 is within the preset reference current value, the comparator 330 outputs an enable signal so that the gate drive 350 operates again.

In this case, the microcontroller 340 receives the sensed current and voltage values and outputs a pulse width modulation control signal input to the switching element of the DC/AC output inverter. That is, the gate drive 350 may receive the output pulse width modulation control signal and output the gate driving signal to the gate of the switching element of the power conversion unit. Here, an inductor voltage of the output terminal of the DC/AC output inverter 313 may be sensed by the voltage sensor 321 and input to the microcontroller 340.

The above description of the present disclosure is for illustrative purposes, and those skilled in the art may understand that it can be easily modified into other specific forms without changing the technical idea or essential features of the present disclosure. Therefore, the embodiments described above should be understood as illustrative in all respects and not limiting. For example, each component described as a single type may be implemented in a distributed manner, and similarly, the components described in the distributed manner may be implemented in a combined form.

The scope of the present disclosure is indicated by the following claims rather than the above detailed description, and all changes or modifications derived from the meaning and scope of the claims and equivalent concepts should be construed as being included in the scope of the present disclosure.

DESCRIPTION OF REFERENCE NUMERALS

100: energy supply unit
200: PDU
300: control device
310: power conversion unit
311: input filter
312: DC/DC converter
313: DC/AC output inverter
314: output filter
320: current sensor
330: comparator
331: first comparator
332: second comparator
340: microcontroller
350: gate drive
400: AC output terminal

What is claimed is:

1. A control device for driving an external load by converting DC voltage received from an energy supply unit of a vehicle into AC voltage to supply power to a load located outside the vehicle, the control device comprising:
   a DC/AC output inverter that converts the received DC voltage into the AC voltage by a switching operation of a switching element of the DC/AC output inverter and outputs the converted AC voltage;
   a current sensor that senses a current value of an output terminal of the DC/AC output inverter;
   a microcontroller that receives the sensed current value and outputs a pulse width modulation (PWM) control signal;
   a gate drive that receives the pulse width modulation (PWM) control signal from the microcontroller and outputs a gate driving signal to a gate of the switching element of the DC/AC output inverter; and
   a comparator, provided between the current sensor and the microcontroller, that compares the current value sensed by the current sensor with a preset range of a reference current value and outputs a disable signal directly to the gate drive, bypassing the microcontroller, to forcibly stop outputting the gate driving signal when the sensed current value is not within the preset range of the reference current value,
   wherein the comparator comprises a first comparator, a second comparator, a first resister, a second resister, and a third resister,
      the first comparator is configured to compare a positive current value of the current value sensed by the current sensor with the preset range of the reference current value,
      the second comparator is configured to compare a negative current value of the current value sensed by the current sensor with the preset range of the reference current value,
      the first resister and the second resister are connected to the positive terminal of the first comparator, and
      the second resister and the third resister are connected to the negative terminal of the second comparator.

2. The control device of claim 1, wherein the reference current value of the first comparator is set to 50 A, and the reference current value of the second comparator is set to −50 A.

3. The control device of claim 2, wherein the first comparator applies the disable signal to the gate drive when the current value sensed by the current sensor is 50 A or more, and
   the second comparator applies the disable signal to the gate drive when the current value sensed by the current sensor in is −50 A or less.

4. The control device of claim 1, wherein the gate drive operates in a burst mode driving method in which the gate drive is turned on/off according to an output signal of the comparator.

5. The control device of claim 1, wherein after the comparator outputs the disable signal to the gate drive to forcibly stop outputting the gate driving signal, the comparator outputs an enable signal so that the gate drive operates again when the current value sensed by the current sensor is within the range of preset reference current value.

6. The control device of claim 1, further comprising:
   an input filter for rectifying the DC voltage outputted from the energy supply unit of the vehicle; and
   a DC/DC converter that boosts the rectified DC voltage and sends it to the DC/AC output inverter.

7. The control device of claim 6, wherein the energy supply unit of the vehicle is a hydrogen fuel cell stack or a high voltage battery.

8. The control device of claim 1, further comprising:
a voltage sensor for sensing a voltage value of the output terminal of the DC/AC output inverter;
an output filter for filtering noise of the AC voltage outputted from the DC/AC output inverter; and
an AC output terminal for receiving an AC voltage of the output filter and applying operating power to an external device.

9. The control device of claim 8, wherein the microcontroller controls the pulse width modulation (PWM) control signal by receiving the current value sensed by the current sensor and the voltage value sensed by the voltage sensor.

10. A control method for driving an external load by converting DC voltage received from an energy supply unit of a vehicle into AC voltage to supply power to a load located outside the vehicle, the method comprising:
converting, by a DC/AC output inverter, the received DC voltage into the AC voltage by a switching operation of a switching element in the DC/AC output inverter and outputting the converted AC voltage;
sensing, by a current sensor, a current value of an output terminal of the DC/AC output inverter;
by a microcontroller, receiving the current value sensed by the current sensor and outputting a pulse width modulation (PWM) control signal;
by a gate drive, receiving the pulse width modulation (PWM) control signal from the microcontroller and outputting a gate driving signal to a gate of the switching element of the DC/AC output inverter; and
comparing, by a comparator provided between the current sensor and the microcontroller, the current value sensed by the current sensor with a preset reference current value and outputting a disable signal directly to the gate drive, bypassing the microcontroller, to forcibly stop outputting the gate driving signal when the sensed current value is not within a range of the preset reference current value,
wherein the comparator comprises a first comparator, a second comparator, a first resister, a second resister, and a third resister,
the first comparator is configured to compare a positive current value of the current value sensed by the current sensor with the preset range of the reference current value,
the second comparator is configured to compare a negative current value of the current value sensed by the current sensor with the preset range of the reference current value,
the first resister and the second resister are connected to a positive terminal of the first comparator, and
the second resister and the third resister are connected to the negative terminal of the second comparator.

11. The control method of claim 10, wherein the reference current value of the first comparator is set to 50 A, and the reference current value of the second comparator is set to −50 A.

12. The control method of claim 11, wherein the first comparator applies the disable signal to the gate drive when the current value sensed by the current sensor is 50 A or more, and
the second comparator applies the disable signal to the gate drive when the current value sensed by the current sensor in is −50 A or less.

13. The control method of claim 12, wherein the gate drive operates in a burst mode driving method in which the gate drive is turned on/off according to an output signal of the comparator.

14. The control method of claim 12, wherein after the outputting the disable signal to forcibly stop outputting the gate driving signal in the comparator, the comparator outputs an enable signal so that the gate drive operates again when the current value sensed by the current sensor is within the range of preset reference current value.

15. The control method of claim 10, further comprising:
before the converting the received DC voltage into the AC voltage and outputting the converted AC voltage,
rectifying the DC voltage outputted from the energy supply unit of the vehicle through an input filter; and
boosting the rectified DC voltage and outputting it to the DC/AC output inverter through a DC/DC converter.

16. The control method of claim 15, wherein the energy supply unit of the vehicle is a hydrogen fuel cell stack or a high voltage battery.

17. The control method of claim 10, further comprising:
after the converting the received DC voltage into the AC voltage and outputting the converted AC voltage,
sensing a voltage value of the output terminal of the DC/AC output inverter by a voltage sensor;
filtering noise of the AC voltage outputted from the DC/AC output inverter through an output filter; and
receiving an AC voltage of the output filter and applying operating power to an external device through an AC output terminal.

18. The control method of claim 17, further comprising:
controlling, by the microcontroller, the pulse width modulation (PWM) control signal by receiving the current value sensed by the current sensor and the voltage value sensed by the voltage sensor.

19. The control device of claim 1, wherein the comparator further comprises a fourth resister and a capacitor,
the fourth resister and the capacitor are connected to an output terminal of the first comparator and an output terminal of the second comparator.

* * * * *